Figure 4:
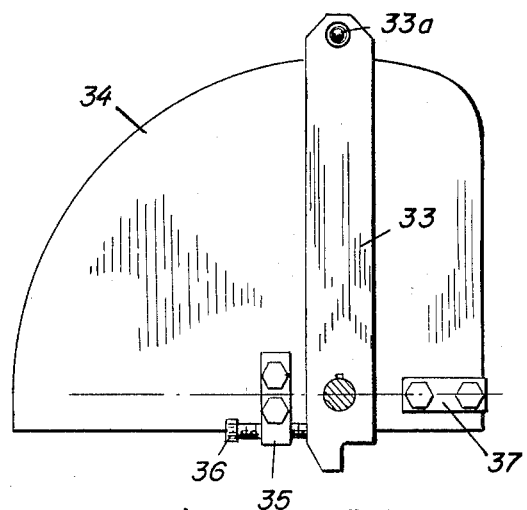

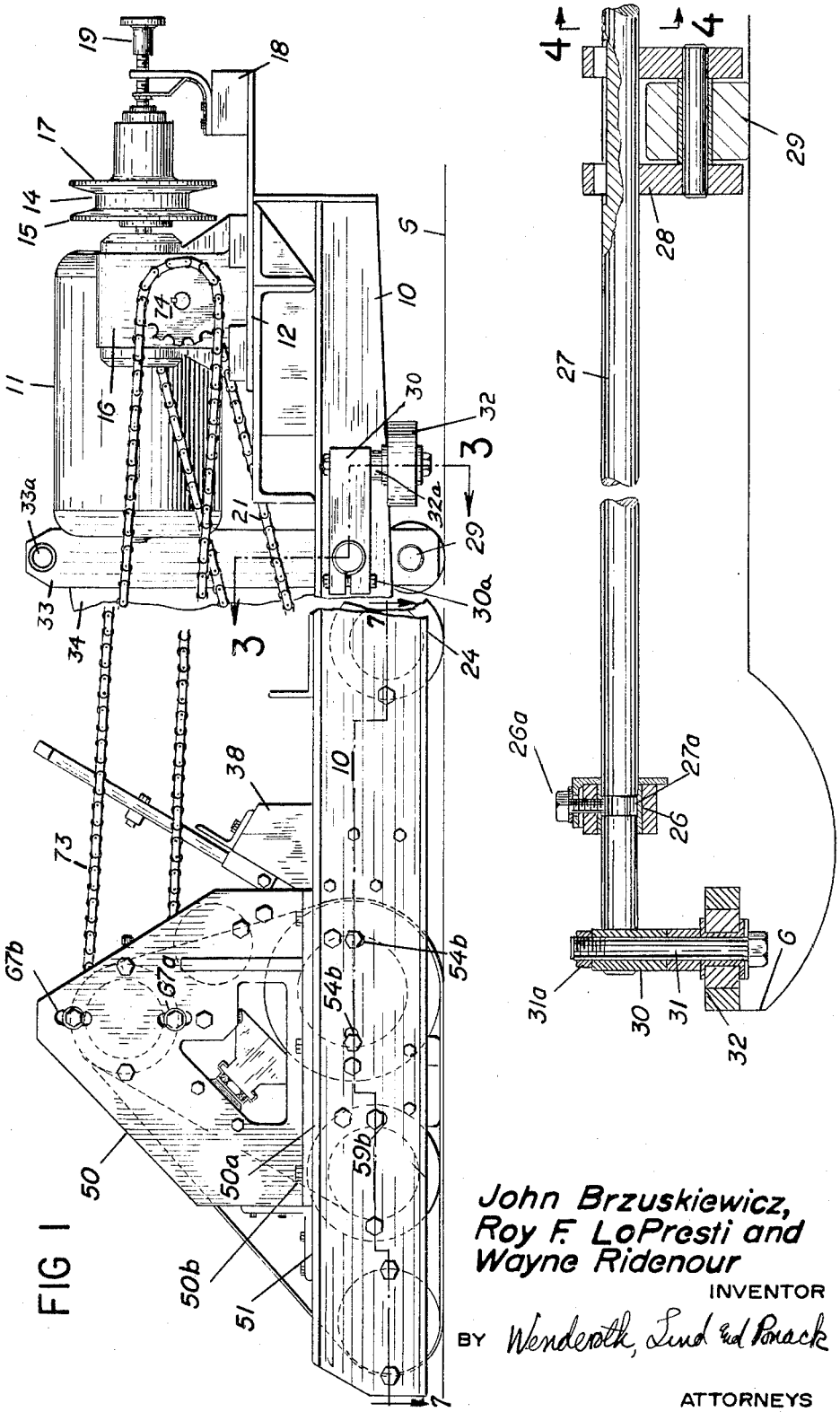

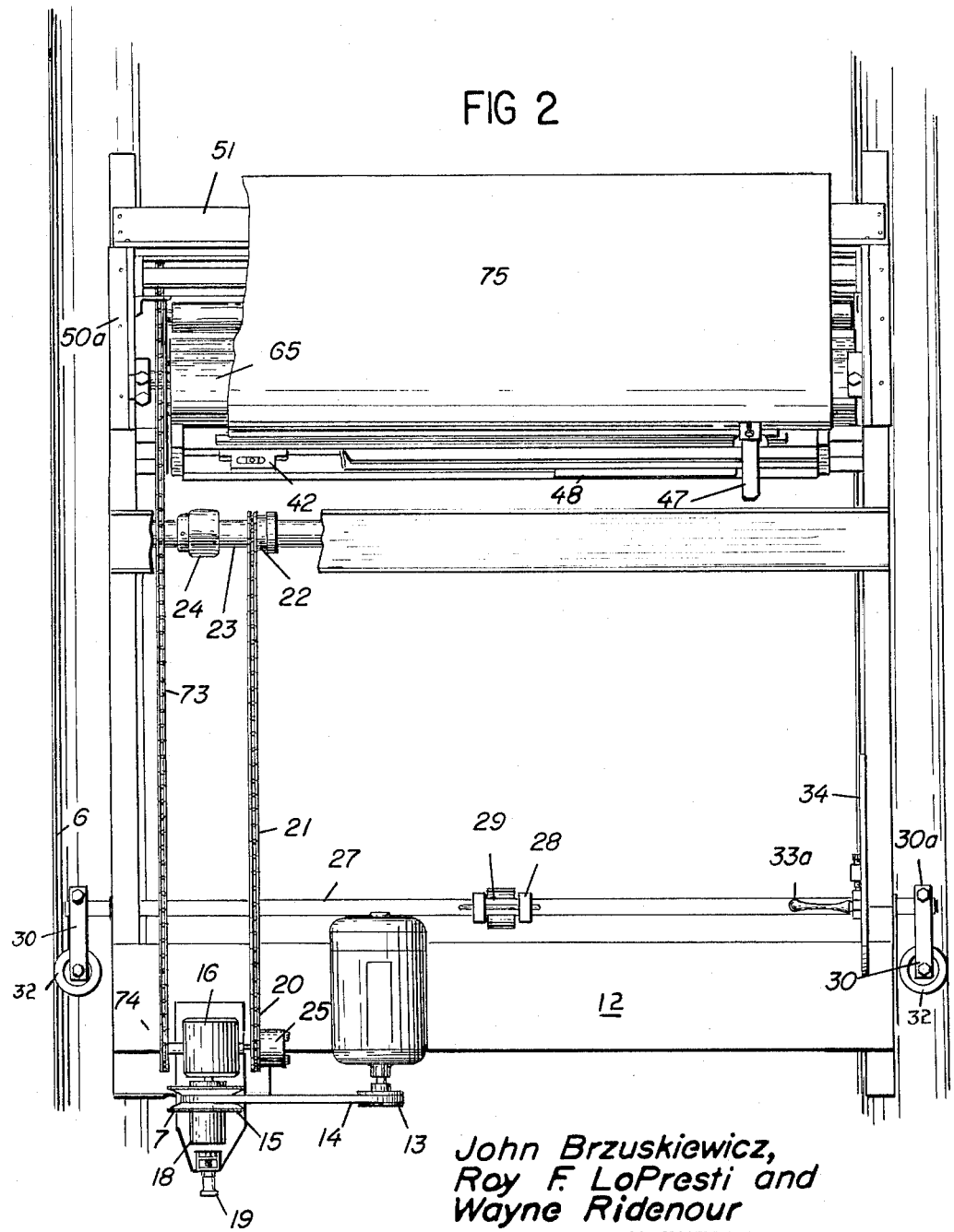

Sept. 20, 1966  J. BRZUSKIEWICZ ET AL  3,273,532
SURFACE COATING APPARATUS

Filed Oct. 30, 1963   5 Sheets-Sheet 3

John Brzuskiewicz
Roy F. LoPresti and
Wayne Ridenour
INVENTORS

BY *Wenderoth, Lind and Ponack*
ATTORNEYS

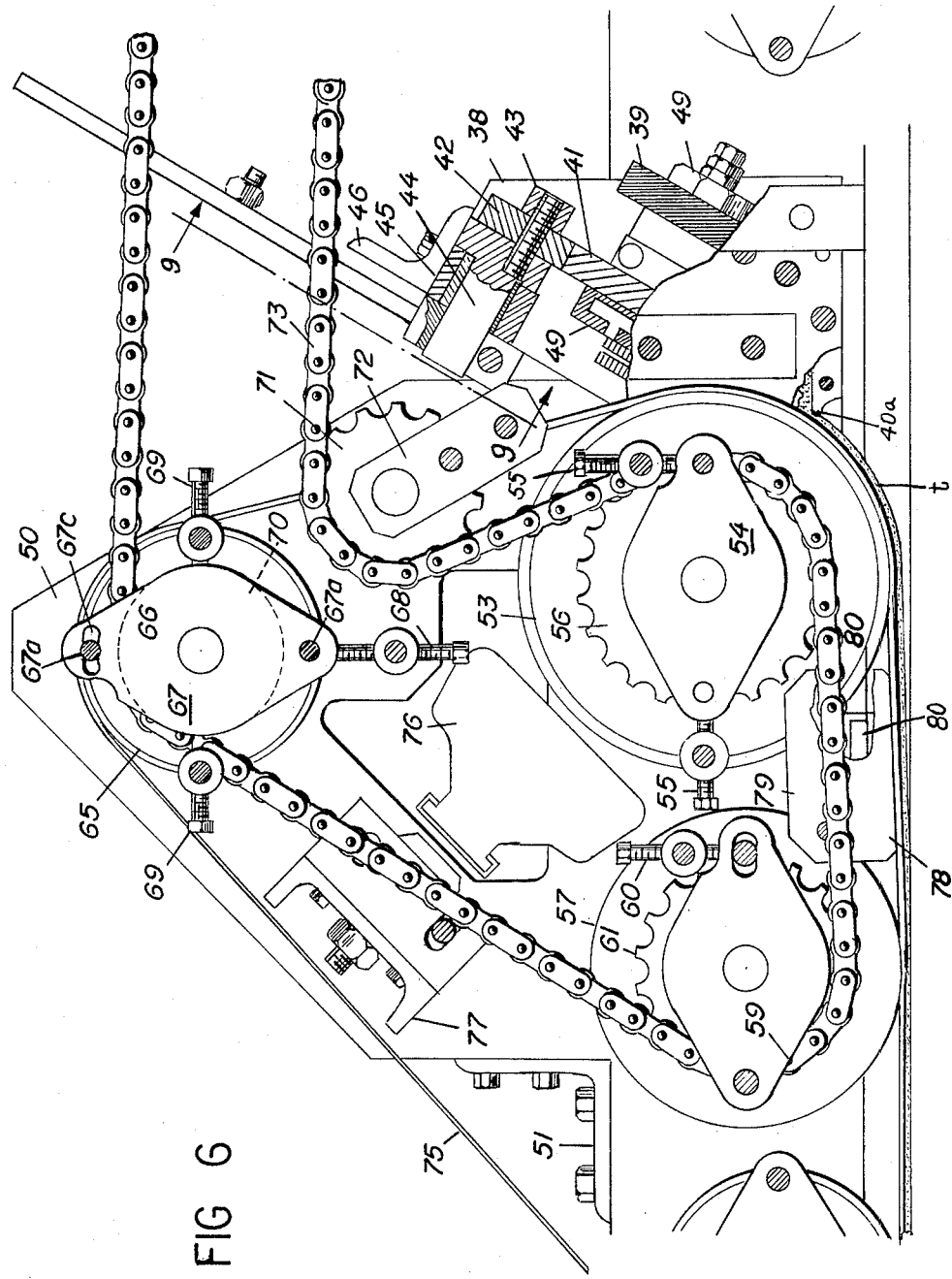

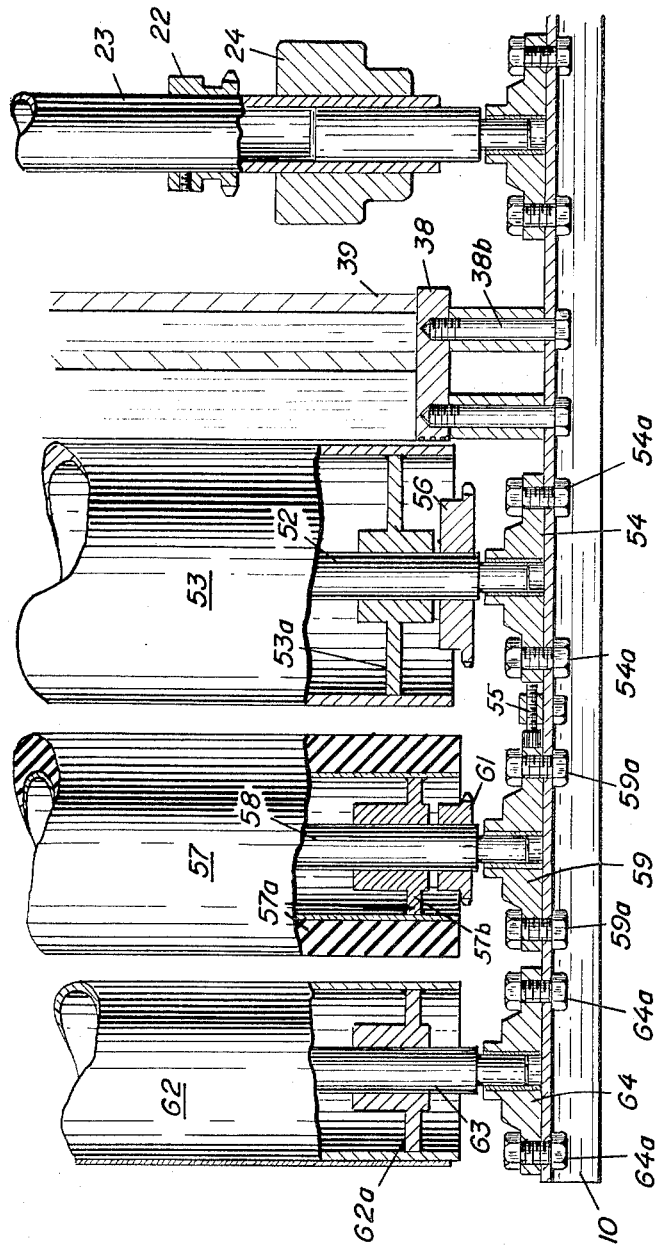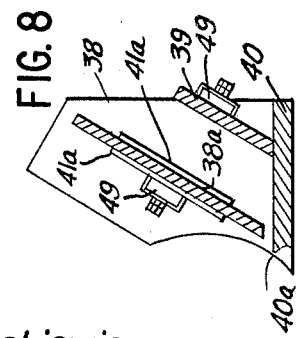

United States Patent Office 3,273,532
Patented Sept. 20, 1966

3,273,532
SURFACE COATING APPARATUS
John Brzuskiewicz, Dolton, and Roy F. Lo Presti and Wayne Ridenour, Chicago, Ill., assignors, by mesne assignments, to Barker Chemical Company, Chicago, Ill.
Filed Oct. 30, 1963, Ser. No. 320,156
7 Claims. (Cl. 118—202)

This invention relates to an apparatus for applying a coating to a surface, and more particularly to an apparatus for applying a coating of hot melt material to a floor, such as a bowling alley.

Many and varied types of coating materials for floor surfaces have been developed, and often these contain a volatile solvent. The application of such coatings to floor surfaces is dangerous when performed in a closed space due to the presence of the volatile solvents in the coating material. In addition, most, if not all, of them require that several applications of the coating material be made to achieve the desired coating effect. On the other hand, certain coating materials have been developed which have been found to be much more effective when applied without the use of solvents by simply melting the coating material and spreading it by various means on the surface to be coated. This type of coating is of course more difficult to apply than coating materials containing solvents because the cooler surface will take the heat from the coating more quickly than a volatile solvent will evaporate, thereby making speed of application a factor in the use of the melted coating materials.

Moreover, there are certain types of floor surfaces which require application of coatings more frequently than others. Outstanding among these are bowling alleys, which in most areas are in substantially constant use during business hours and take considerable wear from the bowling balls striking them and rolling over them. It has been found desirable to provide apparatus which is particularly adapted to apply coatings to such floor surfaces.

It is an object of the present invention to provide an apparatus for applying a coating material to a long and narrow floor surface, such as a bowling alley by melting the coating material and applying the melted material directly to the floor surface so as to satisfactorily coat the floor surface with only a single application of coating material.

It is a further object of the present invention to provide an apparatus for applying a so-called hot melt coating to a floor surface, which apparatus has driving and guiding means thereon which drives and guides the apparatus along the surface to be coated without the necessity for manually steering or propelling it.

It is a still further object of the invention to provide an apparatus for applying a hot melt coating to a floor surface which has means for applying the coating in a layer having a substantially uniform thickness.

Figure 5:
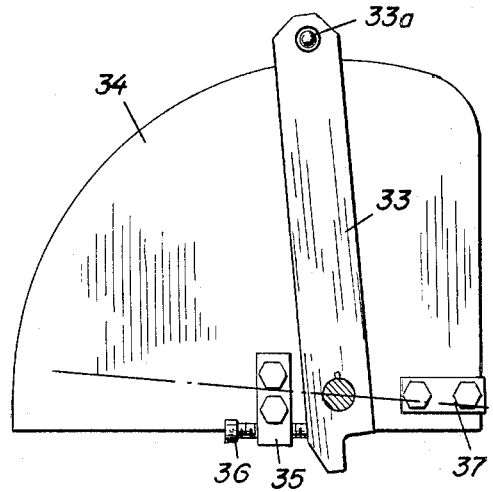
Figure 9:
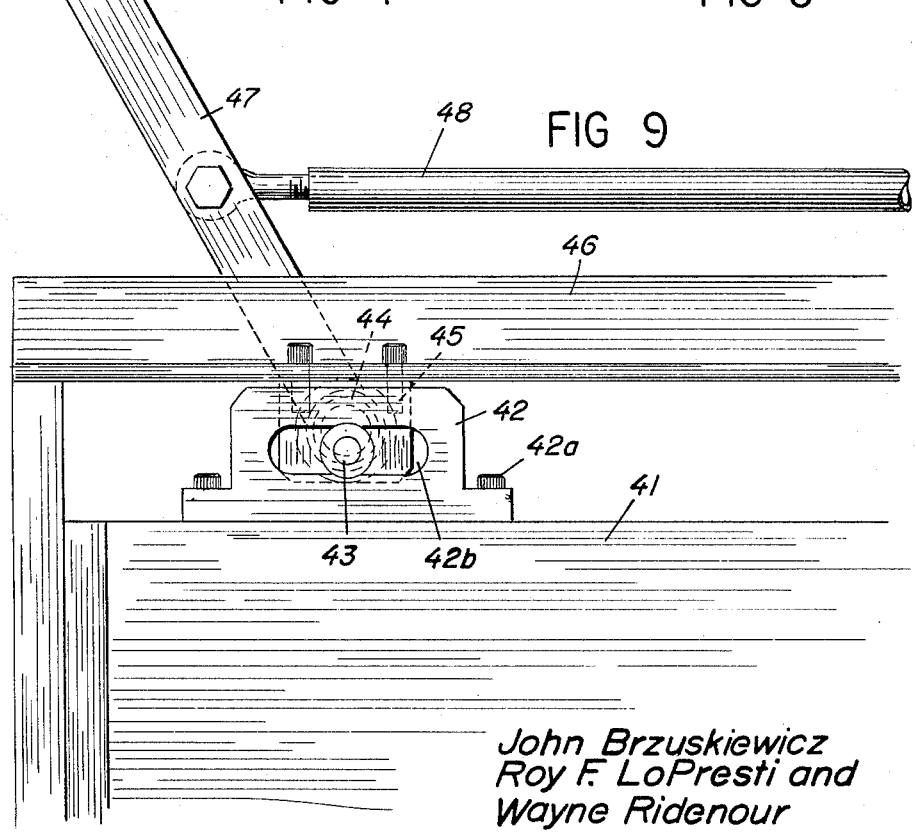

Other and further objects of the present invention will become apparent from the following specification and claims, taken together with the accompanying drawings, in which:

FIG. 1 is a side elevation view of a preferred embodiment of an apparatus according to the present invention;
FIG. 2 is a top plan view of the apparatus of FIG. 1;
FIG. 3 is a sectional view taken on line 3—3 of FIG. 1;
FIG. 4 is a sectional view taken on line 4—4 of FIG. 3;
FIG. 5 is a view similar to that of FIG. 4 showing the front roller handle in a slightly different position;
FIG. 6 is a side elevation view, on an enlarged scale and partly broken away, of the rear part of the preferred embodiment of the apparatus as shown in FIG. 1 with the near side plate removed;

FIG. 7 is a partial sectional view taken along line 7—7 of FIG. 1;
FIG. 8 is a sectional view through the coating material container shown partially in section in FIG. 6; and
FIG. 9 is a view on line 9—9 of FIG. 6.

The front part of the apparatus, which is shown in the right hand portion of FIG. 1, the lower portion of FIG. 2, and FIGS. 3–5, has the machine frame 10 tapered upwardly toward the front of the apparatus, and has a driving motor 11, for example an electric motor, mounted on cross member 12. On the shaft of the driving motor is a driving pulley 13. A belt 14 around the driving pulley 13 drives a driven pulley 15. The driven pulley 15 is mounted on the shaft of a gear reducer 16 which is also mounted on the cross member 12. Either or both of the pulleys 13 and 15 can be the type in which the parts can be moved toward and away from each other to vary the effective diameter of the pulley. The pulley 15 is shown as having one side 17 thereof mounted on a pulley bracket 18 and threadedably adjustable toward and away from the other side of the pulley by means of the knob 19. A drive sprocket wheel 20 is mounted on a shaft projecting from the gear reducer 16. Around sprocket wheel 20 is a drive chain 21 which extends around driven sprocket wheel 22 on the drive wheel shaft 23. Drive wheels 24 are mounted on the drive wheel shaft 23 for rotation therewith and are accordingly rotated so as to roll along the surface S to be coated when the drive shaft 23 is rotated. A clutch member 25 operated by clutch operating means (not shown) can be provided between the sprocket wheel 20 and the shaft of the gear reducer 16 for coupling the sprocket wheel 20 to the gear reducer.

Rotatably mounted in front roller bearing shaft blocks 26 on the frame 10 is a front roller shaft 27. Bolts 26a extend through the bearing blocks 26 into grooves 27a to fix the shaft against axial movement. On the shaft 27 is fixed a pair of spaced front roller arms 28 at a point about midway between the sides of the frame 10. Rotatably mounted between the front roller arms 28 is a front roller 29 which is adapted to roll on the surface S to be coated.

Mounted on each end of the front roller shaft 27 is a guide roller arm 30 which projects parallel to the side of the frame 10, projecting forwardly along the frame in the embodiment shown. The arm is fixed to the front roller shaft 27 by means of clamping bolt or nut 30a which extends through the two extensions on the roller arm 30, so that the positions of the roller arms can be adjusted on the front roller shaft both along the length of the shaft or around the shaft. Through the free end of the guide roller arm 30 extends a guide roller pin 31 in the form of a headed bolt on which a guide roller 32 is rotatably mounted. The guide roller 32 can be spaced from the guide roller arm 30 by a spacer 32a, and the guide roller pin 31 is secured in position by a nut 31a. The guide roller 32 in the preferred embodiment is a rubber tired roller which is adapted to run along the adjacent vertical surface which is above and parallel to the surface to be coated. The roller thus guides the apparatus in its movement along the surface to be coated. In the case of an apparatus specifically for coating bowling alleys, the guide rollers are adapted to run along the surface G at the outside edge of the concave gutters along the edges of the bowling alley.

A front roller handle 33 is fixed to the front roller shaft at a point adjacent one of the frame members along the side of the frame 10, and a hand grip piece 33a is rotatably mounted on the free end of the front roller handle 33. A front roller handle guard 34 is also mounted on the frame 10 adjacent the front roller handle and serves as a guide along which the front roller handle can move. Adjacent the lower end of the front roller handle 33 and mounted on the frame 10 is a rear handle stop 35 having a set screw 36 extending therethrough, and forward of the lower end of the handle 33 and mounted on the frame 10 is a forward handle stop 37.

In operation, the driving motor 11 is energized from a source outside of the apparatus itself to drive the pulleys 13 and 15, belt 14, and gear reducer 16. The clutch member 25 is engaged with the sprocket wheel 20 so as to drive the drive chain 21, which in turn rotates the sprocket wheel 22, drive wheel shaft 23 and drive wheels 24 to move the apparatus along the surface S. The guide roller arms 30 are adjusted along the length of the front roller shaft 27 to bring the guide rollers 32 against the surface G of the gutter of the bowling alley being surfaced, and the front roller handle 33 is rotated so as to rotate the front roller shaft 27 to raise or lower the front roller 29. This causes the frame 10 to pivot around the drive roller shaft 23, since the weight of the motor 11 and the other parts on the front of the apparatus makes the center of gravity lie forward of the drive roller shaft 23. If it is desired to have the rear part of the apparatus raised, the front roller handle 33 is pivoted counter-clockwise in FIGS. 4 and 5 to raise the front roller 29, relative to frame 10, thereby lowering the front end of the apparatus. The set screw 36 is positioned to keep the roller 29 and the roller arms 28 from pivoting clockwise when the apparatus is moving forward. The front roller arm 33 can only be moved until the lower end thereof strikes the forward handle stop 37 at which point the front roller 29 is almost completely drawn up within the frame 10.

In the preferred embodiment of the apparatus, the rear part of the apparatus, shown in the left hand part of FIG. 1, the upper part of FIG. 2 and in FIGS. 6–9, immediately to the rear of the drive wheel shaft 23, has means for holding and delivering a supply of coating material C. This means comprises a coating material container, which has container side plates 38, container back plate 39 which is inclined to the vertical and a doctor blade 40 which extends from the bottom edge of the back plate 39 rearwardly of the apparatus and terminates in a blade edge 40a. The doctor blade forms the bottom of the coating material container and, as will be explained hereinafter, determines the thickness of the coating applied by the apparatus. In the embodiment shown, these parts are bolted to each other and the side plates 38 are bolted to the side frame members of the frame 10 by bolts 38b (see FIG. 7). Other ways of holding the parts of the container together can of course be used, such as welding the parts to each other or forming these parts in an integral casting.

The coating material container has an opening at the bottom thereof which in the preferred embodiment is defined between the top surface of the doctor blade 40 and the bottom edge of a container gate 41 which is slidably mounted in inclined grooves 38a in end plates 38 parallel to back plate 39. In the embodiment shown, the grooves are defined by blocks 41a bolted to the inside surface of side plates 38, but they can also be cast, machined or otherwise formed directly in the side plates.

This container gate likewise serves as means for controlling the size of the opening between its lower edge and the doctor blade 40. Mounted on the upper edge of the container gate 41 by means of screws 42a are two eccentric block slides 42, one adjacent each end of the container gate, and said block slides have elongated horizontal openings 42b therein. Slidably and rotatably positioned in each opening 42b is an eccentric 43 which is mounted on an eccentric shaft 44. Eccentric shafts 44 are in turn rotatably mounted in eccentric shaft bearings 45 secured to the bottom of container brace 46 which is a piece of angle iron or the like connected between the side plates 38. A container gate handle 47 is fixed to each eccentric shaft 44 and the container gate handles 47 at the opposite ends of the container gate 41 are linked by a link 48 pivotally connected to each handle. The eccentric block slides 42, the eccentrics 43, the eccentric shafts 44 and the container gate handles 47 and the link 48 together form means for moving the container gate up and down, movement of either handle rotating the eccentric shafts 44 and causing the eccentrics 43 to move up or down in relation to the frame of the apparatus, as well as laterally, during their rotation. The slidable and rotatable connection between the eccentrics 43 and the container gate 41 in turn causes the gate to move up or down depending on the direction of rotation of the eccentrics and the eccentric shafts.

Heating means in the form of electric strip heaters 49 are mounted on the outside surfaces of the back plate 39 and the container gate 41 in order to provide heat for keeping the contents of the coating material container hot. The power for these heaters can be supplied through wires, not shown, leading from the machine to a power supply, or from the same wires that supply the driving motor 11.

Also mounted on the rear part of the apparatus are means for forming and applying the coating to the surface to be coated. This means, in the preferred embodiment of the invention, comprise a belt and roller means shown in FIGS. 1, 2, 6 and 7 which is mounted between the side members of the frame and between two side plates 50. The side plates 50 have bottom flanges 50a thereon which are secured to the side members of frame 10 by bolts 50b or the like. The side plates 50 are braced across the back of the apparatus by a cross brace 51 in the form of an angle iron or the like which is secured both to the frame 10 and the side plates 50 by securing means in the form of bolts. As best seen in FIGS. 6 and 7, a fountain roller shaft 52 is rotatably mounted in bearings 54, the position of which is adjustable on the side members of frame 10. The bolts 54a securing the bearings to the side members extend through slots 54b (see FIG. 1) in the side members of the frame, and adjusting screws 55 for both horizontal and vertical adjustment are mounted on mountings secured to the side members of the frame. Discs 53a are mounted adjacent opposite ends of the shafts 52 and the cylindrical fountain roller drum 53 is secured on the discs 53a. Also mounted on one end of the shaft 52 is a fountain roll sprocket wheel 56.

Immediately to the rear of the fountain roller 53 is a pressure roller 57 which is mounted by means of discs 57b on a pressure roller shaft 58 mounted in pressure roller bearings 59 also secured to the inside of the side members of the frame 10 by means of bolts 59a. Bearings 59 are adjustable vertically by reason of the bolts 59a extending through slots 59b in the side members (see FIG. 1) and by means of the adjusting screws 60 mounted in the mountings secured to the side members of the frame. Pressure roller 57 has a covering 57a of rubber or some similar material which is resilient and softer than the metal of the roller itself. Also mounted on one end of the shaft 58 is a pressure roller sprocket wheel 61.

To the rear of the pressure roller 57 is an idler roller 62 which is mounted by means of discs 62a on an idler roller shaft 63, which in turn is mounted in idler roller bearings 64 mounted on the side members of the frame 10 by means of bolts 64a. A belt tensioning roller 65 is mounted on a shaft 66 between bearings 67 on the inside of the side plates 50. Bolts 67a holding the bearings on the side plates 50 extend through vertically extending slots 67b in the side plates (see FIG. 1) and vertical adjusting screws 68 are mounted on the insides of the side plates 50 and contact the ends of bearings 67 for adjusting them vertically. The upper bolt 67a extends through a curved slot 67c in the upper ends of the bearings 67, and horizontal adjusting screws 69 are mounted on the insides of the side plates 50 and contact opposite sides of the bearings 67 for adjusting them horizontally. A belt tensioning roller sprocket wheel 70 is mounted on one end of the shaft 66.

A chain take-up sprocket wheel 71 is mounted on the inside of the near side plate 50 above the fountain roll 53. The sprocket wheel is mounted on an adjustable bracket 72 bolted or otherwise secured to the inside of the near side plate 50. Means for rotating the fountain roll 53 and the pressure roller 57 is provided in the form of a roller drive chain 73 which runs over the take-up sprocket wheel 71, the sprocket wheels 56 and 61 on the fountain roll 53 and the pressure roller 57 respectively, and then over the sprocket wheel 70 on the belt tensioning roller 65. The drive chain 73 is driven by sprocket wheel 74 on the opposite side of the gear reducer 16 from the sprocket wheel 20 (see FIG. 2).

The means for forming and applying the coating further comprise an endless belt 75 which is substantially the same width as the width of the apparatus, and in the present embodiment is substantially the same width as the width of a bowling alley. The belt 75 extends around the fountain roll 53 past edge 40a of the doctor blade 40 and then beneath the pressure roller 57 and around the idler 62 and 65. It will be understood that by loosening the bolts 54a which hold the fountain roll bearings 54, and turning the adjusting screws 55, the position of the fountain roll 53 can be adjusted so that the surface of the belt 75 is spaced from the edge 40a of the doctor blade 40 a distance equal to the thickness of the coating it is desired to apply to the surface. Thereafter, after the bolts 54a are tightened, the bolts 59a can be loosened to loosen the bearings 59 and the adjusting screw 60 turned to adjust the height of the pressure roller 57 until the roller presses on the back of the belt 75 and presses the surface of the belt toward the surface to be coated with the desired pressure. Thereupon, after the bolts 59a are tightened, the bolts 67a are loosened to loosen the bearings 67, and the tension adjusting idler roller 65 until the desired tension is produced on the belt 75. The bolts 67a are then tightened again.

Heating means for heating the coating material to keep it in the molten condition are provided on the means for forming and applying the coating and comprise an electric heater 76 which extends along the top and is spaced from the fountain roll 53. The heater 76 is mounted on a cross brace 77 which extends between the side plates 50. The power supply for this heater is the same as for the strip heaters 49 on the coating material container. In addition, a heater bar 78 extends between the side members of the frame 10 immediately above the belt 75 between the fountain roll 53 and the pressure roller 57. The heater bar 78 is mounted on adjustable end pieces 79 which are bolted or otherwise secured to the side members of the frame 10, and on the back of the heater bar is an electric strip heater 80 which is supplied with power from the same source as the other electric heaters.

In operation, the front roller handle 33 is adjusted until the front roller 29 is at the correct height for pivoting the frame 10 around the drive wheels so that the surface of the belt 75 does not contact the surface to be coated. The set screw 36 is set and then the guide rollers 32 are positioned as described above. The pulleys 13 and 15 are adjusted to drive the sprocket wheels 20 and 74 at the desired speed, and the clutch 25 is left disengaged. The container for the coating material is then filled, either with solid coating material C, for example in granular or stick form, which is melted by the strip heaters 49, or with molten material C which is kept molten by the strip heaters.

To bring the rollers 53, 57, 62, and 65 and belt 75 up to the proper temperature before starting the application of the coating, gate 41 is lowered to contact doctor blade 40 to prevent molten coating from coming into contact with belt 75, and with clutch 25 disengaged so that the machine is stationary and with the rollers out of contact with the surface to be coated, the roller belt assembly is driven at operating speed in order that the heat from heaters 76 and 80 will be uniformly distributed throughout the system. The fountain roll 53 is then positioned as described above so that the correct thickness of coating material will be applied to the belt 75 at the doctor blade 40, and the tension of the belt 75 is then adjusted to the desired tension. The heaters 76 and 80 are energized, and the apparatus is ready to apply coating material. The front roller handle 29 is then moved so as to lower the back end of the apparatus into coating position. When the clutch 25 is engaged the drive wheels 24 are rotated to move the apparatus along the surface to be coated, and the belt 75 moves past the edge 40a of the doctor blade 40 and has applied thereto a molten coating t of the coating material. The belt conveys this coating t around the fountain roll 53, the heat from the heater 76 being transferred from the fountain roll through the belt to the layer of coating to keep the coating molten. The belt 75 conveys the coating beneath the heater bar 78 where further heat is supplied to keep the coating material t molten, and then the belt passes beneath the pressure roller 57 which passes beneath the pressure roller 57 which presses the coating and the belt against the surface to be coated to transfer the molten coating material t from the belt to the surface in a smooth even coating.

If it is found that too little coating material is being supplied to the belt 75 from the doctor blade 40, or coating material is accumulating above the doctor blade, one of the container gate handles 47 is moved in the proper direction to raise or lower the gate 41 according to the nature of the condition which is to be corrected. The link 48 insures that the other handle 47 is moved in the same manner to move the other end of the gate.

It is thus seen that there has been provided an apparatus which applys a hot melt type of coating to a long and narrow floor surface, such as a bowling alley, by melting the coating material and applying it directly to the floor surface. The apparatus transfers the coating material from a container therefor to the surface to be coated and at the same time melts it and also applies it to the surface in a smooth and uniform coating. The apparatus further is driven along the surface to be coated, and in the case where it is adapted to be used on a bowling alley, is provided with means for automatically guiding the apparatus along the alley. The apparatus is compact and simple to build and maintain, and is easy to adjust for the thickness of the coating and the supply of the coating material to the means for applying the coating.

It is thought that the invention and its advantages will be understood from the foregoing description and it is apparent that various changes may be made in the form, construction and arrangement of the parts without departing from the spirit and scope of the invention as set forth in the claims, the forms hereinbefore described and illustrated in the drawings being merely preferred embodiments thereof.

What is claimed is:

1. An apparatus for applying a hot melt type of coating material to a surface, comprising a frame, driving means on the frame for driving the apparatus along the surface to be coated, said driving means comprising a driving motor on the front end of the frame and driving wheels positioned to the rear of the center of gravity of said apparatus and adapted to roll on the surface to be coated, adjustable guiding means on the said front end of the frame and extending laterally of the frame and adapted to bear in guiding engagement on vertical lateral surfaces along the surface to be coated for guiding the apparatus along the surface to be coated, frame height adjusting means on said front end of said frame for adjusting the height of the frame relative to the surface to be coated and comprising a front roller mounted adjacent the front of the frame and adapted to roll on the surface to be coated and support some of the weight of the apparatus, and means connected to said front roller for raising and lowering the front roller, whereby when the front roller is raised or lowered, the rear of the frame is lowered and raised as it pivots about the driving wheels, means adjacent the rear end of the frame for holding a supply of hot melt type coating material and keeping it molten and for delivering the molten material, and means on the rear end of the frame for forming and applying a layer of the molten hot melt material from the holding and delivering means to the surface to be coated.

2. An apparatus as claimed in claim 1 in which said means connected to said front roller for raising and lowering the front roller comprise a front roller axle, a pair of arms fixed to said front roller axle and between which the front roller is rotatably mounted, a front roller handle connected to said axle, and stop means on said apparatus limiting the amount of movement of said handle.

3. An apparatus for applying a hot melt type of coating material to a surface, comprising a frame, driving means for driving the apparatus along the surface to be coated and including a motor on the front end of the frame, guiding means on the said front end of the frame and adapted to bear in guiding engagement on lateral surfaces along the surface to be coated for guiding the apparatus along the surface to be coated, coating material container and delivery means adjacent the rear end of the frame and holding a supply of hot melt type of coating material and keeping it molten and for delivering the molten material, said container and delivery means comprising a container having a bottom with a doctor blade thereon extending toward the rear end of the frame, and a container gate above said doctor blade forming a wall of the container and movable toward and away from said doctor blade for varying the opening defined between the container gate and the doctor blade, belt forming and applying means adjacent the container and delivery means for receiving a layer of molten hot melt material from the container and delivery means and conveying it and applying it to the surface to be coated and comprising a plurality of rollers extending transversely of said frame, at least one of which is adjacent said doctor blade, and an endless belt around said rollers to which coating material is delivered through the opening between the container gate and the doctor blade and which has an even coating spread thereon by the doctor blade, at least some of said rollers being coupled to said driving means for rotation by said driving means for moving said belt.

4. An apparatus as claimed in claim 3 in which said container and delivery means further comprises heaters thereon for keeping the coating material therein molten, and further heater means adjacent the roller closest to said doctor blade for heating said roller to keep the coating material spread on said belt in the molten condition as it is conveyed around said roller on said belt.

5. An apparatus as claimed in claim 3 in which said belt means further comprises bearing means in which said rollers are mounted, at least the bearing means in which the roller closest to the doctor blade is mounted being movable toward and away from the doctor blade and movable up and down on said frame for adjusting the belt relative to the doctor blade, and the bearings in which at least one other of said rollers is mounted being adjustable for adjusting said at least one other roller for tensioning the belt.

6. An apparatus as claimed in claim 3 in which at least one of said rollers is a pressure roller and has a slightly resilient covering on the periphery thereof of a material softer than the material of the other rollers, and said belt means further comprises bearing means in which said pressure roller is mounted, said bearing means being adjustable up and down on the said frame for adjusting the pressure of said pressure roller on said belt toward the surface to be coated.

7. An apparatus as claimed in claim 3 in which said belt means further comprises a bar heater means adjacent the back of said belt between the roller of said plurality of rollers which is adjacent said doctor blade and the roller of said plurality which is on the side of said first mentioned roller remote from the doctor blade.

References Cited by the Examiner

UNITED STATES PATENTS

| | | |
|---|---|---|
| 1,640,776 | 8/1927 | Kuhlhoff. |
| 2,589,257 | 3/1952 | Horning. |
| 2,591,502 | 4/1952 | Bohannan et al. |
| 2,763,019 | 9/1956 | Huber _____ 15—503 X |
| 3,083,390 | 4/1963 | Wroten _____ 15—103.05 |

FOREIGN PATENTS 948,336  8/1956  Germany.

CHARLES A. WILLMUTH, *Primary Examiner.*

L. G. MACHLIN, *Assistant Examiner.*